United States Patent [19]

Morales

[11] 4,302,020
[45] Nov. 24, 1981

[54] ACTUATING SEALING JOINT

[75] Inventor: Kenneth A. Morales, Cayce, S.C.

[73] Assignee: United Aircraft Products, Inc., Dayton, Ohio

[21] Appl. No.: 127,973

[22] Filed: Mar. 7, 1980

[51] Int. Cl.³ ............................................. F16J 15/08
[52] U.S. Cl. .................................... 277/205; 277/236
[58] Field of Search ............... 277/166, 122, 205, 102, 277/105, 236

[56] References Cited
U.S. PATENT DOCUMENTS 869,536 10/1907 Weber .................................. 277/205

Primary Examiner—Robert I. Smith
Attorney, Agent, or Firm—J. E. Beringer

[57] ABSTRACT

A joint for sealing around rods, shafts, cylinders and the like. A metallic sealing ring is configured for axial pressure control and is installed without substantial frictional contact with surfaces to be sealed. An actuating member is a part of the joint and is applied in a manner to expand inside and outside diameters of the sealing ring into contact with the sealed surfaces as a part of the installation process.

7 Claims, 5 Drawing Figures

ACTUATING SEALING JOINT

BACKGROUND OF THE INVENTION

Metallic sealing rings are known in installations encountering high pressure or high temperature, or both, including axial pressure type installations in which the sealing ring surrounds a fixed rod, shaft or like projection. Frequently the sealing ring exterior is coated with another, softer material for example silver. The flow of the finish material improves sealing.

In installing the sealing ring it has been conventional to place the ring under compression to occasion a springback effect in which opposing surfaces on the seal are urged outward into contact with surfaces to be sealed. In an axial pressure type installation, this compression has been obtained by forming a taper or bevel on either one or both parts contacted by the seal, so that, in the course of inserting the seal in its accommodating recess, it will inherently be compressed a proper amount in a radial sense. One objection to this procedure is that the added machining in forming the taper or bevel represents added cost. Another objection is that in sliding the seal in place against frictional resistance, sealing surfaces thereon may be scratched or otherwise damaged. Imperfect sealing can result and the seal may be made unfit for repeated use. In addition, repeatability of an accomplished seal may be difficult to achieve with replacement seals which are dimensioned at extremes of an allowable range of tolerances. In the drawings hereof, and in description to follow, a prior art seal installation is disclosed. That disclosure, taken with the foregoing statement of the background of the invention, constitutes the state of the art, prior to this invention, as applicant and those associated with him in preparation of this application for patent are aware of it.

SUMMARY OF THE INVENTION

A sealing joint in accordance with the present invention provides for seating of a generally toroidal sealing element in a recess surrounding a projecting rod, cylinder or the like. Surfaces to be sealed are on the projecting portion and on an opposing longitudinally extending wall of the recess, and inner and outer diameters of the sealing element are adapted to have an interference fit with the sealed surfaces. The sealing element has normally a relatively loose fit in the recess. It can be installed in and removed from its accommodating recess without frictional, sliding contact with sealed and adjacent surfaces. An actuator is comprised in the sealing joint, and, in assembly of the joint, inherently expands the sealing element to achieve an interference fit. The sealing element is a resilient, compressible member. Its defining contour includes a gap penetrated by the actuator to cause sealing surfaces on inner and outer peripheries of the element to move radially toward an interference fit with the sealed surfaces. The sealing element is not subject to surface damage during its installation and removal. The effectiveness of its contact with sealed surfaces is not materially affected by variations in tolerance. Tapered or other machined configurations on parts between which the sealing element is installed, provided to achieve a predetermined compression of the sealing element, are unnecessary. An interference fit between sealing and sealed surfaces is accomplished by expansion rather than by compression.

The invention lends itself to use with a single sealing element, or with multiple elements in series relation. In a use of multiple elements, alternating actuators may be provided or sealing elements may be arranged to actuate one upon another.

An object of the invention is to provide an actuated sealing joint substantially in accordance with the foregoing.

Other objects and structural details of the invention will more clearly appear from the following description, when read in connection with the accompanying drawings, wherein.

THE PRIOR ART

Figure 1:
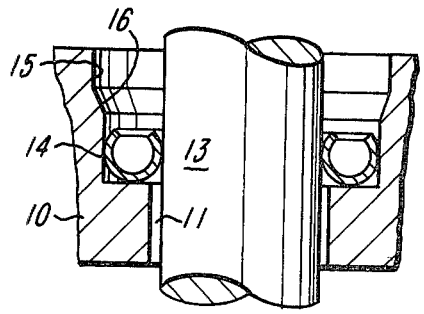
FIG. 1 is a fragmentary view, partly diagrammatic, of a sealing joint in accordance with prior art teachings.
Figure 2:
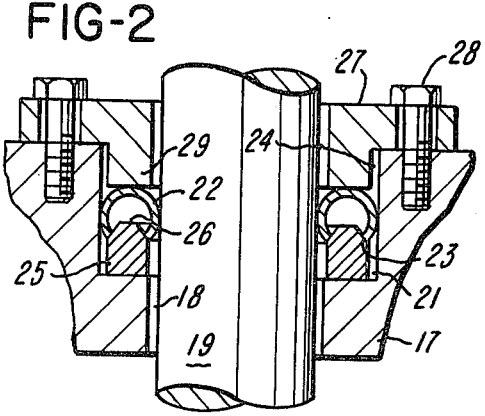
FIG. 2 is a view similar to FIG. 1, showing an illustrated embodiment of the present invention.
Figure 3:
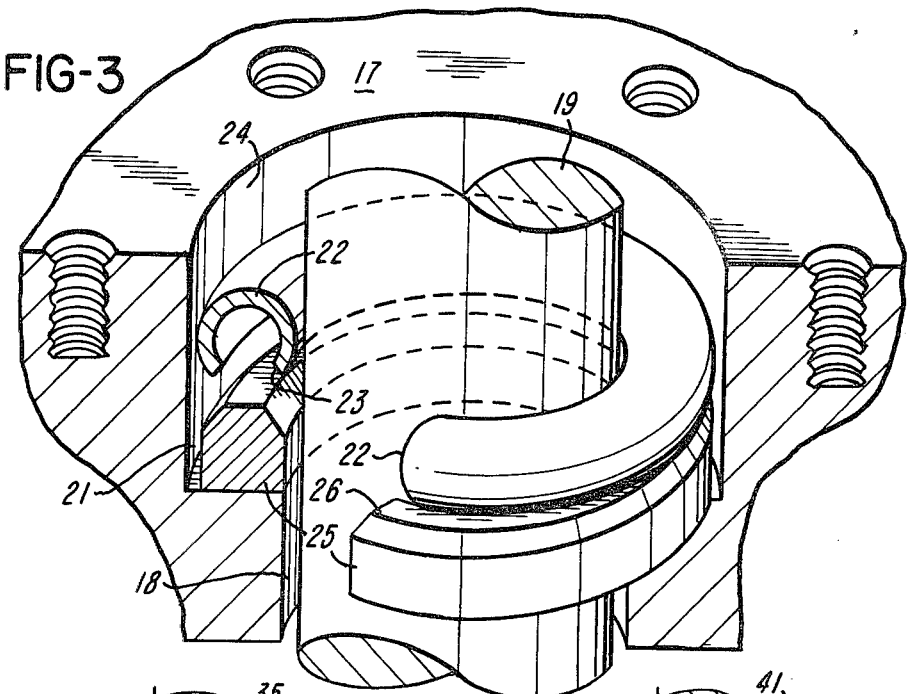
FIG. 3 is a view in perspective, illustrating an assembly step in connection with the embodiment of FIG. 1.

Referring to FIG. 1 of the drawings, as is in part diagrammatically there shown, a prior art sealing joint includes a housing body 10 having a through bore 11 and an outwardly facing counterbore 12. A rod 13 projects from the housing body through bore 11 and through and beyond counterbore 12. Body 10 and rod 13 are fixed with respect to one another, the sealing joint illustrated being of the static type. Counterbore 12 accommodates the installation therein of a resilient, compressible, metallic sealing element 14. The sealing element is toroidal in configuration and generally U-shaped in cross section, its formation and position in the assembly being such to seal against axially applied pressures, that is, against gas or liquid flow lengthwise along rod 13. In the illustrated instance, that portion of its circular outline including a gap faces outwardly of counterbore 12 while inner and outer peripheral surfaces of the element define sealing surfaces adapted respectively to contact the periphery of rod 13 and a longitudinal wall 15 of the counterbore. Rod 13 cooperates with wall 15 and with the bottom of the counterbore in forming a recess in which element 14 is inserted, the closed portion of the sealing element seating to the bottom of the recess.

The sealing element has a free height, that is, a cross sectional dimension between the sealing surfaces on its inner and outer diameters, exceeding the distance between wall 15 and an opposing wall as represented by the periphery of rod 13. Accordingly, in inserting the element into its accommodating recess, the ring is compressed and an interference fit of sealing with sealed surfaces effected. To simplify this procedure, wall 15 may be relatively expanded at what may be regarded as its entrance end and include a connecting taper 16. In either event, movement of the sealing element to its seat in recess 12 is accompanied by sliding frictional contact of the element surface with body 10 and rod 13. Surface damage to the sealing element may result, particularly when that surface is comprised of a layer of relatively soft metal or synthetic material. Effectiveness and reliability of the seal may thus be affected. Also, and since proper compression of the sealing element is important to the establishing and maintaining of a proper seal, tolerances involved in machining or otherwise forming the parts of the joint can affect seal reliability. In particular, repeatability of an accomplished seal, using a replacement seal element, may be adversely affected.

The sealing element 14 has been described as U-shaped. It is a continuously curved member, and is perhaps better or more commonly identified as a C-ring in which the gap between compressible arms appears in what may be regarded as an upper face of the ring. In the example illustrated, it has been assumed that the higher fluid pressure is external to the housing or above cavity 12 as the parts are shown. The sealing ring is introduced into its cavity either in the position shown or in a relatively inverted position, depending upon whether the high fluid pressure is internally of the housing or external thereto. Fluid pressure is allowed to enter the sealing ring, through the gap in its circumference, and assist in urging the sealing surfaces radially outward into contact with the sealed surfaces.

In descriptions to follow, it has been assumed that the higher fluid pressure is internal to the housing and attempting to escape longitudinally upward or outward along the projecting rod or shaft. Hence in FIGS. 2-5 the sealing ring is shown as introduced into its cavity with the gap therein facing downwardly, in position to face the region of higher fluid pressure.

THE INVENTION

A sealing joint of the present invention provides a positively acting means for obtaining an interference fit of the sealing element with sealed surfaces, which means is not intrinsically damaging to the sealing element surface and is relatively unaffected by tolerance variations.

For convenience of illustration, the invention is disclosed in an embodiment as shown in FIG. 1. Accordingly, and referring to FIGS. 2 and 3, a housing body 17 has a through opening 18 through which projects a rod 19. A counterbore in body 17 provides a recess 21 receiving a sealing element 22. Element 22 is or may be like element 14, except for being relatively inverted as above noted, and accordingly is a resilient, deformable, metallic member, C-shaped in cross section, with a formed gap 23 appearing in what may be regarded as a lower face of the defined ring. Inner and outer peripheral surfaces of the sealing element act as sealing surfaces and are adapted to contact respective sealed surfaces as represented respectively by the peripheral surface of rod 19 and the longitudinal wall 24 of recess 21.

The free height of the sealing element, that is, the distance between its sealing surfaces in a normal or relaxed condition of the element, is less than the distance between the sealed surfaces. Thus, in installing a sealing element 22 in recess 21, it is admitted to an installed position without frictional contact with rod 19 or with wall 24 and accordingly is not subject to surface damage. The taper 16, which appears in prior art installations, or a corresponding configuration on rod 13, is unnecessary.

To accomplish an interference fit between sealing and sealed surfaces, there is provided an actuator ring 25 which is received in recess 21 in a preceding relation to sealing element 22. Inner and outer peripheral surfaces of actuator 25, at one end face thereof, are inclined to produce a tapered nose portion 26 at said one end face. Actuator 25 orients in recess 21 with tapered nose portion 26 facing and substantially aligning with sealing element gap 23. The parts are dimensioned such that nose portion 26 may enter gap 23, with continued inward movement being effective to spread apart the deflectable arms which comprise inner and outer peripheral portions of the sealing element. Such spreading action relatively separates sealing surfaces of the sealing element which are compelled thereby to assume sealing contact with opposing surfaces on rod 19 and wall 24. The degree of deflection or expansion of the sealing element is a function of the degree of penetration of gap 23 by nose 26 and this in turn is dedetermined by the amount of inward thrust imparted in the installation process. While such inward thrust may be variously applied, it is in the illustrated instance applied by a plate 27 closing recess 21 and attached, as by bolts 28, to housing body 17. An annular flange 29, on an inner face of plate 27, is adapted to enter recess 21 and engage an adjacent closed face of sealing element 22. In applying plate 27 to body 17, flange 29 inherently engages element 22 and effects an inward thrust thereof sufficient to a proper expansion thereof as dictated by actuator 25. Parts are held in an assembled relation, with element 22 expanded into sealing contact with the sealed surfaces, by bolts 28. Engagement of the flange 27 with body 17 limits expansion of the sealing element and it will be understood that the accomplished inward thrust of flange 29 can be varied, as by a use of shims or the like. The length of the tapered nose 26 is adequate to enforce a proper and repeatable sealing contact of sealing with sealed surfaces throughout a range of expected tolerance variations.

That end face of actuator 25 opposite nose portion 26 is flat and adapted to seat flushly to the bottom of recess 21. The actuator is introduced into the assembly simply by dropping it into recess 21 and allowing it to come to rest on the bottom thereof. Seating element 22 is introduced into the recess in a following relation to actuator 25, with gap 23 facing downwardly or in a facing relation to nose portion 26. The free height of the sealing element is such that it moves freely in the recess with no appreciable contact with recess wall 24 or the surface of rod 19. The sealing element may, therefore, come to rest on actuator 25 with gap 23 in an embracing relation to nose portion 26. An initial inward thrust of flange 29, acting on sealing element 22, positively engages deflectable arm ends of the sealing element with respective nose taper surfaces. Continued inward thrust of the flange effects first a firm seating of the actuator ring to the bottom of recess 21, and then takes place relative to the actuator, causing deflectable arm ends of the sealing element to ride up the nose taper surfaces in a separating relation to one another. The sealing surfaces are in this manner wedged out into a resilient, pressured contact with the sealed surfaces and held in such position by a locking of plate 27 in place.

Figure 4:
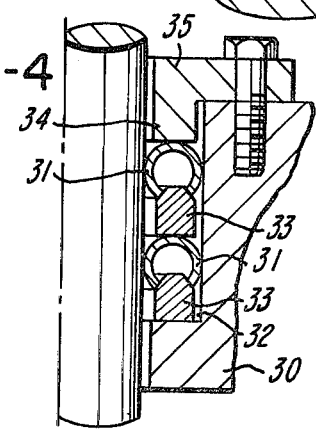
FIG. 4 is a fragmentary view, similar to FIG. 2, showing another illustrated form of the invention.
Figure 5:
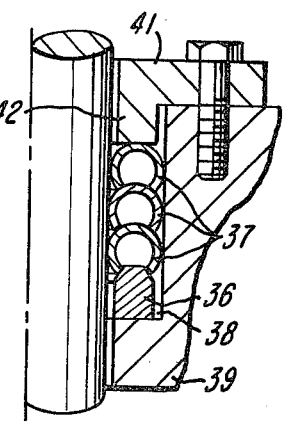
FIG. 5 is a view like FIG. 4, showing a further illustrated form of the invention.

As indicated in FIGS. 4 and 5, the principle of an actuated seal is applicable to multiple series arranged sealing elements, as well as to single seals. In FIG. 4, sealing elements 31, like elements 22, are installed in a recess 32 in a bushing body 30 in a following or series relation to one another. Actuator rings 33, like actuator 25, are mounted in an alternating relation to the sealing elements. Under the thrust of an annular flange 34 on a plate 35, the sealing element-actuator assembly reacts upon the bottom of recess 32 whereupon continued inward thrusting pressure causes tapered noses on the several actuators to penetrate gaps in associated sealing element and expand such elements into sealing contact with opposing sealed surfaces. The result is creation of a labyrinth type seal in which substantially equal seals are made at longitudinally spaced locations along sealed surfaces.

In FIG. 5, a single actuator 36 is used in conjunction with series arranged sealing elements 37. The assembly of sealing elements and actuator ring is received in a recess 38 in a body 39 and backed by a plate 41 having a thrust flange 42. Elements 37 are alike and are installed in like fashion in the recess 38. Accordingly, the gap in an inner sealing element is in a substantially embracing relation to the closed face of an adjacent, outer element. In response to mounting of the plate 41 to the bushing body 39, flange 42 thereon effects an axial thrusting movement of series arranged sealing elements. Resultant pressure, as applied through the series of sealing elements 37, seats actuator 36 to the bottom of recess 38, with continued advance of the flange 42 effecting expansion of all of the elements of the series. Sealing contact with sealed surfaces accordingly is accomplished in effecting a labyrinth type seal. As will be understood, whereas expansion of an innermost sealing element 37 is effected by penetration of the actuator 36 into a presented gap in the sealing element, expansion of successively outwardly positioning sealing elements is accomplished by a movement of each element into the related gap configuration of an adjacent element. The several sealing elements of the series accordingly assume a substantially nested relation in which each sealing element becomes an actuating member in relation to an overlying or succeeding sealing element. The sealing elements 37 may be configured so that the opposing deflectable arms which comprise inner and outer peripheral portions of the element are spaced apart a distance greater than is the case with respect to sealing elements 22 and 31.

The invention has been disclosed with respect to certain illustrated embodiments. It will be understood that these and modifications within the scope of persons skilled in the art are within the intent and comprehension of the invention.

What is claimed is:

1. A sealing joint, including means providing a recess and a rod projecting axially through said recess, said rod and an outer wall of said recess defining concentric radially spaced apart surfaces to be sealed, a continuous generally toroidal sealing member circular in cross section in said recess and providing sealing surfaces on inside and outside diameters thereof, an end face of the sealing member being open, an actuating member received in said recess and having a tapered nose portion to be received in the open end face of said sealing member, said members being in a preceding succeeding relation in said recess, and means for effecting an axial relative approaching motion of said members causing an interior penetration of said sealing member by the tapered nose portion of said actuating member and a relative separating motion of said sealing surfaces, said sealing member having a free height normally less than the distance between said surfaces to be sealed and being expansible by said means effecting an axial relative approaching motion of said members to move sealing surfaces thereon radially outwardly into contact with said surfaces to be sealed.

2. A sealing joint according to claim 1, said sealing member having a substantially C-shape in cross section with said open end face thereof appearing as a gap in said cross section, the balance of the cross sectional shape being substantially continuously curved, said sealing member being made of a material giving it a springback capability.

3. A sealing joint according to claim 2, said sealing member being a metallic C-ring adapted for axial pressure control.

4. A sealing joint according to claim 2, the configuration of said sealing member defining separated arm portions adapted to be contacted by taper surfaces on said actuating member and moved in a separating relation as a consequence of relative approaching motion of said members.

5. A sealing joint according to claim 1, said actuating member seating to the bottom of said recess and reacting thereon under an applied axial pressure of said sealing member.

6. A sealing joint according to claim 1, a plurality of sealing members being received in said recess in a following relation to one another, actuating members being provided in an alternating relation to said sealing members, and said means for effecting a relative approaching motion of said members providing a pressure applied to an outer end of the series of sealing members and actuating members, an inner end of said series seating to and reacting upon the bottom of said recess.

7. A sealing joint according to claim 1, a plurality of sealing members being received in said recess in a following relation to one another and said actuating member positioning at one end of the series of sealing members so defined and engaging in the open end face of an adjacent sealing member, sealing members beyond said adjacent member interfitting with one another, and plate means closing said recess, said series of sealing members and end positioning actuating member being adapted to be compressed between said plate means and the bottom of said recess to effect said relative approaching motion and induce a separating motion of the sealing surfaces of all said sealing members.

* * * * *